United States Patent
Uchiyama et al.

(10) Patent No.: US 9,839,932 B2
(45) Date of Patent: Dec. 12, 2017

(54) SURFACE CHEMICAL TREATMENT APPARATUS FOR DRAWING PREDETERMINED PATTERN BY CARRYING OUT A CHEMICAL TREATMENT

(71) Applicants: SHIMADZU CORPORATION, Kyoto-shi, Kyoto (JP); TOKYO METROPOLITAN UNIVERSITY, Tokyo (JP); WASEDA UNIVERSITY, Tokyo (JP)

(72) Inventors: Katsumi Uchiyama, Tokyo (JP); Hizuru Nakajima, Tokyo (JP); Ming Yang, Tokyo (JP); Hulie Zeng, Tokyo (JP); Yoshiyuki Sugahara, Tokyo (JP); Takahiro Nishimoto, Kyoto (JP)

(73) Assignees: SHIMADZU CORPORATION, Kyoto (JP); TOKYO METROPOLITAN UNIVERSITY, Tokyo (JP); WASEDA UNIVERSITY, Tokyo (JP)

(*) Notice: Subject to any disclaimer, the term of this patent is extended or adjusted under 35 U.S.C. 154(b) by 0 days.

(21) Appl. No.: 14/766,494

(22) PCT Filed: Feb. 14, 2013

(86) PCT No.: PCT/JP2013/053492
§ 371 (c)(1),
(2) Date: Aug. 7, 2015

(87) PCT Pub. No.: WO2014/125591
PCT Pub. Date: Aug. 21, 2014

(65) Prior Publication Data
US 2015/0376796 A1    Dec. 31, 2015

(51) Int. Cl.
C23F 1/08   (2006.01)
B05B 15/04   (2006.01)
(Continued)

(52) U.S. Cl.
CPC .......... B05B 15/0431 (2013.01); B01J 19/00 (2013.01); B05B 7/06 (2013.01); B05B 7/14 (2013.01);
(Continued)

(58) Field of Classification Search
CPC .......... B05B 15/04; B05B 13/06; B05B 7/04; B05B 7/06; B05B 7/14; B05C 11/10;
(Continued)

(56) References Cited

U.S. PATENT DOCUMENTS 4,826,084 A * 5/1989 Wallace .................... B05B 7/06
239/290
5,520,735 A * 5/1996 Mulder .................. B05B 5/032
118/308

(Continued)

FOREIGN PATENT DOCUMENTS

CN    101581728 A    11/2009
JP    2010-172817 A    8/2010

OTHER PUBLICATIONS

Communication dated Jun. 30, 2016, from the State Intellectual Property Office of the P.R.C., in counterpart Chinese application No. 201380073044.0.
(Continued)

Primary Examiner — Karl Kurple
(74) Attorney, Agent, or Firm — Sughrue Mion, PLLC

(57) ABSTRACT

A surface chemical treatment apparatus provided with: a first conduit having an opening at one end and communicating with a liquid supply means at the other end; a second conduit having at one end an opening that surrounds the opening of the first conduit and communicating with a liquid suction means at the other end; and a moving mechanism for moving the openings of the first and second conduits relative to the solid phase surface, so as to make a surface chemical
(Continued)

treatment possible in a fine pattern by allowing the patterning solution to be dispensed through the opening of the first conduit while allowing the solution to be suctioned up together with the surrounding liquid phase or gas phase medium through the opening of the second conduit that surrounds the opening of the first conduit and, thus, preventing seepage of the solution in all directions.

8 Claims, 2 Drawing Sheets

(51) Int. Cl.
    *B05C 9/06*     (2006.01)
    *B05B 7/06*     (2006.01)
    *B05C 3/20*     (2006.01)
    *B01J 19/00*     (2006.01)
    *B05C 5/02*     (2006.01)
    *B05B 7/14*     (2006.01)
    *C23F 1/00*     (2006.01)

(52) U.S. Cl.
    CPC ............ *B05B 15/0412* (2013.01); *B05C 3/20* (2013.01); *B05C 5/02* (2013.01); *B05C 9/06* (2013.01); *C23F 1/00* (2013.01); *C23F 1/08* (2013.01)

(58) Field of Classification Search
    CPC .. B05C 19/04; B05C 7/04; B05C 9/14; B05D 3/02; B05D 7/22; C25D 5/02
    See application file for complete search history.

(56) References Cited

U.S. PATENT DOCUMENTS

| | | | | |
|---|---|---|---|---|
| 9,163,308 | B2* | 10/2015 | Bi | C23C 16/402 |
| 2001/0044259 | A1* | 11/2001 | Akedo | B24C 1/00 |
| | | | | 451/38 |
| 2002/0007869 | A1* | 1/2002 | Pui | B05B 1/14 |
| | | | | 141/173 |
| 2002/0014403 | A1* | 2/2002 | Hoshino | B82Y 10/00 |
| | | | | 204/192.32 |
| 2002/0076184 | A1* | 6/2002 | Iyoki | B82Y 20/00 |
| | | | | 385/123 |
| 2003/0038110 | A1* | 2/2003 | Bachrach | H01L 21/6708 |
| | | | | 216/52 |
| 2003/0048314 | A1* | 3/2003 | Renn | C23C 24/04 |
| | | | | 347/6 |
| 2007/0034605 | A1* | 2/2007 | Corliss | G03F 7/2041 |
| | | | | 216/83 |
| 2007/0154641 | A1* | 7/2007 | Kobayashi | C23C 24/04 |
| | | | | 427/282 |
| 2007/0215725 | A1* | 9/2007 | Bunker | G01N 1/02 |
| | | | | 239/551 |
| 2007/0221540 | A1* | 9/2007 | Dziadzio | A62C 31/05 |
| | | | | 208/113 |
| 2007/0229789 | A1* | 10/2007 | Kawamura | G03F 7/70341 |
| | | | | 355/53 |
| 2008/0023444 | A1* | 1/2008 | Osawa | H01L 21/6708 |
| | | | | 216/83 |
| 2009/0027640 | A1* | 1/2009 | Shibazaki | G03F 7/70775 |
| | | | | 355/53 |
| 2009/0033900 | A1* | 2/2009 | Kanaya | G03F 7/70775 |
| | | | | 355/53 |
| 2009/0051895 | A1* | 2/2009 | Shibazaki | G03F 7/70775 |
| | | | | 355/72 |
| 2009/0053629 | A1* | 2/2009 | Shibazaki | G03F 7/70775 |
| | | | | 430/30 |
| 2011/0117275 | A1* | 5/2011 | Sato | C23C 24/04 |
| | | | | 427/180 |
| 2014/0370203 | A1* | 12/2014 | Sailer | C23C 24/04 |
| | | | | 427/455 |
| 2015/0336120 | A1* | 11/2015 | Khandelwal | B05D 7/22 |
| | | | | 118/50 |
| 2016/0074900 | A1* | 3/2016 | Okamoto | B05C 19/025 |
| | | | | 118/621 |
| 2016/0102394 | A1* | 4/2016 | Xiong | C23C 24/04 |
| | | | | 427/456 |
| 2016/0129634 | A1* | 5/2016 | Keicher | B05B 7/06 |
| | | | | 425/70 |
| 2016/0168715 | A1* | 6/2016 | Ma | C23C 18/1607 |
| | | | | 174/268 |
| 2016/0228896 | A1* | 8/2016 | Jones | B05B 15/008 |

OTHER PUBLICATIONS

David Juncker et al., "Multipurpose microfluidic probe", nature materials/Advance Online Publication (www.nature.com/naturematerials), Jul. 24, 2005, pp. 1-7.

Alar Ainla et al., A multifunctional pipette:, Lab Chip, 2012, pp. 1255-1261, vol. 12.

International Search Report for PCT/JP2013/053492 dated May 7, 2013.

* cited by examiner

US 9,839,932 B2

SURFACE CHEMICAL TREATMENT APPARATUS FOR DRAWING PREDETERMINED PATTERN BY CARRYING OUT A CHEMICAL TREATMENT

CROSS REFERENCE TO RELATED APPLICATIONS

This application is a National Stage of International Application No. PCT/JP2013/053492 filed Feb. 14, 2013, the contents of all of which are incorporated herein by reference in their entirety.

TECHNICAL FIELD

The present invention relates to a technology for chemically patterning a solid phase surface such as of glass material or a silicon substrate in a gas phase or a liquid phase so as to construct molecules having a specific function followed by a solid phase synthetic reaction or analysis.

BACKGROUND ART

In the case wherein a solid phase surface such as of glass material or a silicon substrate is chemically treated using certain molecules, a conventional technique as illustrated below is generally used wherein a solution where the molecules are dissolved in a solvent as a solute is utilized.

One example is a method for completely immersing the solid phase surface to be chemically processed in the above-described solution. In this case, the solid phase surface is chemically treated by means of molecules in the solution without having selectivity in terms of the location.

Another example is a method for drawing a predetermined pattern on a solid phase surface with the above-described solution being dispensed by a dispenser (apparatus for discharging a set amount of liquid). In this case, the solid phase surface is chemically treated with the above-described solute with locational selectivity. In accordance with this method using a dispenser, the fineness of the patterning can be increased to a certain extent by scaling down the diameter of the opening of the dispenser.

In the field of microfluidics, a technology using a tool referred to as a microfluidic probe or a micropipette is known as a technology for dispensing a microscopic amount of solution onto a solid phase surface.

Tools referred to as microfluidics probes have a flat surface, referred to as the mesa, formed at the end of a probe made of Si or the like and also have two openings created next to the mesa. These tools dispense a solution through one opening in a state wherein the mesa faces a solid phase surface in parallel and, at the same time, suction up the solution through the other opening so that the dispensed solution can be prevented from spreading, making it possible for the solution to stay in a narrow region (see Non-Patent Document 1).

Meanwhile, tools referred to as micropipettes have three openings aligned in a line in an end portion of a pipette made of polydimethylsiloxane (PDMS) or the like. There tools dispense a solution through the center opening and, at the same time, suction up the solution through the openings on the two sides so that the solution can be prevented from spreading over the solid phase surface in the same manner as described above (see Non-Patent Document 2).

PRIOR ART DOCUMENTS

Non-Patent Documents

Non-Patent Document 1: David Juncker et al. "Multipurpose microfluidic probe" nature materials ADVANCE ONLINE PUBLICATION (www.nature.com/naturematerials), 24 Jul. 2005

Non-Patent Document 2: Alar Ainla et al. "A multifunctional pipette" lab chip, 2012, 12, p 1255-1261, The Royal Society of Chemistry

SUMMARY OF THE INVENTION

Problem to be Solved by the Invention

From among the above-described conventional techniques, the technique for immersing a solid phase surface to be chemically processed in solution cannot be used in the case wherein a solid phase surface is treated with locational selectivity.

In contrast, the technique for drawing a predetermined pattern on a solid phase surface with a solution using a dispenser has a limitation in the miniaturization of the area where molecules are fixed for chemical treatment due to restrictions in the manufacturing technology or in the ease of maintenance. In addition, the number of openings for dispensation is usually one and, therefore, it is difficult to dispense two or more types of solutions required for reaction.

Meanwhile, in the case wherein a tool referred to as a microfluidics probe or a micropipette of the microfluidics technology is used, an opening for suction is provided next to, or openings for suction are provided on both sides of the opening for dispensation of a solution so as to prevent the solution from spreading over the solid phase surface. Therefore, it is possible to miniaturize the pattern as compared to the above-described technique. In these tools, however, the openings for suction are located along a line containing the opening for dispensation and, thus, the effects of suppressing the spread of the solution in the direction orthogonal to the line are limitative and such a problem arises that it is not easy to prevent so-called seepage in all directions.

The present invention is provided in view of such circumstances, and an object of the invention is to provide a surface chemical treatment apparatus for fine patterning with locational selectivity wherein the efficiency of fixing molecules to a solid phase surface in a solution is increased and the solution dispensed onto the solid phase surface can be prevented from spreading without fail, making it possible to miniaturize the area for fixation.

Means for Solving Problem

In order to achieve the above-described object, the surface chemical treatment apparatus for fine patterning according to an aspect of the present invention is characterized in that the apparatus carries out a chemical treatment in a predetermined pattern on a solid phase surface placed in a gas phase or liquid phase medium. The apparatus includes a first conduit, a supply conduit, a second conduit, and a moving mechanism. The first conduit has an opening at one end and communicates at the other end with a liquid supply section for supplying a patterning solution which reacts with the solid phase surface for a chemical treatment on the surface. The supply conduit supplies a sheath liquid through which a sheath liquid is supplied towards the first conduit so that a sheath flow can be created in the first conduit so as to converge the patterning solution to the center. The second conduit has at one end an opening that surrounds the opening of the first conduit and communicates with a liquid suction section at the other end. The moving mechanism moves the openings of the first and second conduits relative to the solid phase. The openings of the first and second conduits face the surface of the solid phase. The surface of the solid phase is provided within the gas phase or the liquid phase medium. A chemically treated region in a predetermined pattern is created by moving the openings of the first and second conduits relative to the solid phase surface while allowing the patterning solution to be supplied into the first conduit from the liquid supply section, and at the same time. This allows the sheath liquid to be supplied into the first conduit from the conduit for supplying a sheath liquid so that the patterning solution is converged to the center, and is then dispensed through the opening of the first conduit, and while driving the liquid suction section so that the patterning solution dispensed through the opening of the first conduit is suctioned up together with the gas phase or liquid phase medium through the opening of the second conduit.

Here, the present invention can adopt a structure wherein the moving mechanism is a mechanism for moving the openings and the solid phase surface in a three-dimensional manner relative to each other, and the openings and the solid phase surface move relative to each other according to a route that has been set in advance by a setting section.

In addition, the present invention can have such a structure that the above-described moving mechanism is a mechanism for moving the openings and the solid phase surface in a three-dimensional manner relative to each other, and the openings and the solid phase surface move relative to each other by a route that has been set in advance by a setting means (claim 3).

The present invention can also adopt such a structure that the above-described first and second conduits, or the above-described first and second conduits together with the conduit for supplying sheath liquid, are made of a structure formed of Si.

In the present invention a double pipe structure is provided in proximity to the opening for dispensing a solution so that a solution is dispensed from the inner pipe while the solution is being suctioned up by the outer pipe and, thus, the object can be achieved.

That is to say, the first conduit having an opening at one end communicates with a liquid supply means at the other end, and the second conduit having at one end an opening that surrounds the opening of the first conduit communicates with a liquid suction means at the other end. In addition, the openings of the first and second conduits are made to face the solid phase surface to be patterned in a gas phase or liquid phase medium that covers the solid phase surface. In this state, the liquid supply means and the liquid suction means are driven at the same time so that a patterning solution is dispensed through the opening of the first conduit and, at the same time, the patterning solution and the gas phase or liquid phase medium are suctioned up through the opening of the second conduit that surrounds the opening of the first conduit.

Through the above-described operation the patterning solution that has been dispensed through the opening of the first conduit towards the solid phase surface is suctioned up from the periphery in all directions. As a result, it is possible to prevent seepage over the solid phase surface in any direction. Thus, the solute in the solution can be condensed and fixed to a microscopic area of a region on the solid phase surface with the efficiency of fixation being increased as compared to conventional apparatuses and techniques. That is to say, in accordance with the present invention, miniaturization of the area for fixation can be made possible while increasing the efficiency of fixing the solute in a solution to the solid phase surface and, thus, a surface chemical treatment apparatus for fine patterning with a high efficiency can be achieved.

By using the apparatus according to the present invention, molecules having a function in accordance with a specific purpose can be formed into any fine pattern in any location on a glass material or on a silicon substrate.

In addition, it is possible to form molecules having a thionyl group into a pattern on a metal film and it is also possible to form other molecules in specific locations on top of the pattern.

In accordance with one aspect of the invention, a sheath liquid is supplied into the first conduit so as to form a sheath flow so that the patterning solution is converged to the center of the first conduit. Accordingly, the patterning solution dispensed through the opening of the first conduit creates a flow that is narrower than the opening of the first conduit when it reaches the solid phase surface, which makes finer patterning possible. This structure using a sheath flow makes it possible to further miniaturize the area for fixing molecules even when there is a limitation to the scaling down of the diameter of the opening of the first conduit due to restrictions in the manufacturing technology or in the ease of maintenance.

The moving mechanism for moving the openings of the first and second conduits relative to the solid phase surface for patterning is advantageous in creating the same patterns on the same solid phase surface or on a number of solid phase surfaces when a mechanism for moving the openings and the solid phase surface according a route set by a setting means as in one aspect of the invention. At this time, it is preferable to move the openings relative to the solid phase surface in the direction in which they approach or move away from each other in accordance with the setting in addition to in the direction in a plane along the solid phase surface because the distances between the solid state surface and the first and second openings become factors that affect the line width of patterning. When such a moving mechanism for moving the openings relative to the solid phase surface in accordance with the setting is adopted, such an application is possible that molecules are fixed to one solid phase surface using a certain solution and, after that, other molecules are fixed to the surface using another solution so as to achieve a specific positional relationship with, or so as to overlap, the pattern in which the molecules have been fixed.

In the present invention the first conduit and the second conduit or the conduit for supplying a sheath liquid in addition to the first and second conduits may be formed through glasswork or may be formed of a variety of resins. However, the conduits can be made of a structure using Si as in one aspect of the invention so that miniaturization of the pattern can made easier.

DETAILED DESCRIPTION OF EMBODIMENTS

Figure 1:
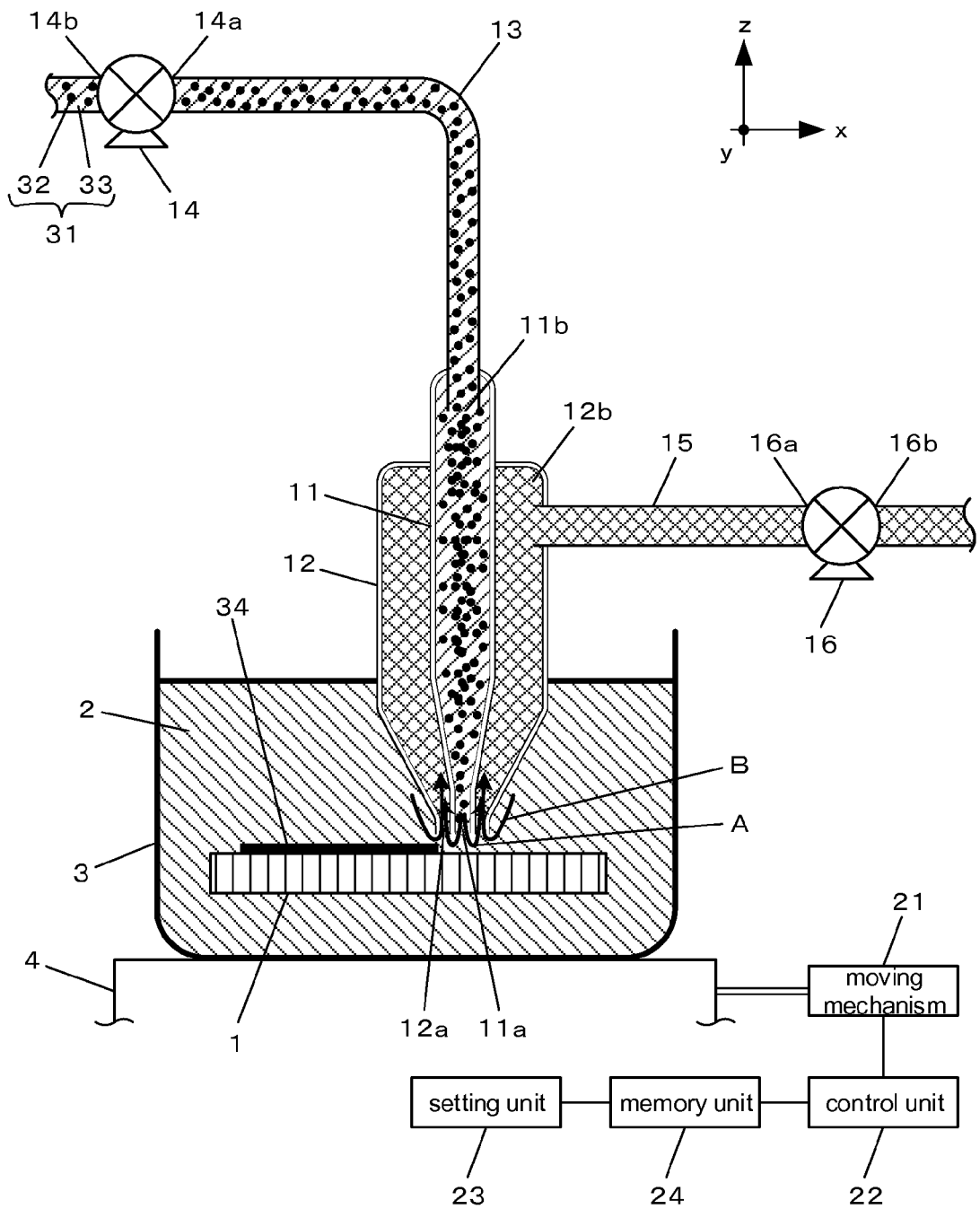
FIG. 1 is a schematic diagram showing the basic structure of an embodiment of the present invention.

In the following preferred embodiments according to the present invention are described in reference to the drawings. FIG. 1 is a schematic diagram showing the basic structure according to the embodiment of the present invention.

A solid phase surface 1 such as of a glass material or a silicon substrate on which a patterning process is to be carried out is supported by a support member (not shown) so as to be placed within a container 3 in which a gas or liquid phase medium, liquid phase medium 2 in this example, is held and, thus, is subject to a treatment in a state of immersion within the liquid phase medium 2. The container 3 is fixed onto a stage 4. The stage 4 is driven by a moving mechanism 21 so as to move in the x and y directions along the solid phase surface 1 as well as in the z direction that is orthogonal thereto. The moving mechanism 21 is subject to control by a control unit 22 and the control unit 22 controls the moving mechanism 21 so that the stage 4 moves through the movement route set by a setting unit 23 and stored in a memory unit 24. Here, the control unit 22, the setting unit 23 and the memory unit 24 can be formed of a computer and its peripheral equipment.

A dual conduit made up of a first conduit 11 and a second conduit 12 that is provided so as to surround the first conduit 11 is provided above the stage 4. One end (bottom end) of each of these conduits 11 and 12 forms an opening 11a and 12a, respectively, and these openings 11a and 12a face the solid phase surface 1 in a state of immersion within the liquid phase medium 2.

The other end (upper end) 11b of the first conduit 11 communicates with the opening for dispensing 14a of a pump for injection 14 via a pipe 13. The opening for suction 14b of this pump for injection 14 is connected to a patterning solution tank (not shown) for storing a patterning solution 31. The patterning solution 31 is provided by dissolving a solute 32 into a solvent 33, and the solvent 33 may be the same liquid as the liquid phase medium 2 in the container 3.

The other end (upper end) 12b of the second conduit 12 communicates with the opening for suction 16a of a pump for discharge 16 via a pipe 15. The opening for dispensing 16b of this pump for discharge 16 communicates with an opening for liquid discharge (not shown).

How the above-described embodiment operates is described below. Prior to the actual driving of the apparatus, a moving route of the stage 4 is set in advance through the operation of the setting unit 23 on the basis of a pattern to be drawn on the solid phase surface 1. The contents of this setting are stored in the memory unit 24.

When a drive start instruction is given to the apparatus both the pump for injection 14 and the pump for discharge 16 are driven while the moving mechanism 21 is controlled and driven along the route of movement stored in the memory unit 24 so as to move the stage 4. The pump for injection 14 is driven so that the patterning solution 31 flows into the first conduit 11 and, then, flows out of the conduit towards the solid phase surface 1 through the opening 11a at the lower end of the conduit. When the patterning solution 31 flows out, the solute 32 that has been dissolved into the solvent 33 is fixed in a predetermined pattern on the solid phase surface 1 and, thus, a patterning region 34 is created by the solute 32. At this time, the pump for discharge 16 is also driven and, therefore, the solvent 33 in the patterning solution 31 that has flown out through the opening 11a of the first conduit 11 and part of the solute 32 are suctioned up through the opening 12a of the second conduit 12 that is located so as to surround the opening 11a as shown by the arrow A in the figure and, at the same time, the surrounding liquid phase medium 2 is also suctioned up through the opening 12a of the conduit 12 as shown by the arrow B.

During this operation the patterning solution 31 that has been dispensed through the opening 11a of the first conduit 11 is suctioned up through the opening 12a of the second conduit 12 that is positioned so as to surround the opening 11a and, therefore, the spread of the patterning region 34 where the solute 32 is fixed through contact with the solid phase surface 1 can be suppressed in all directions on the solid phase surface 1 and, thus, seepage can be prevented. As a result, the solute 32 can be condensed and fixed in a microscopic region and, thus, the fixation efficiency increases.

An example of a microreactor that is fabricated in accordance with the above-described embodiment is described below. This example shows a structure wherein a pattern is drawn with a temperature responsive high polymer on only a target surface of a capillary plate made of glass. The microreactor allows a substance A to be fixed to the capillary portion of this capillary plate so that a substance B reacts on the temperature responsive high polymer side. The reactor makes it possible for the substances A and B to react with each other only in a specified portion through hydrophilic control (Laplace pressure control) using a temperature responsive high polymer.

In the structure wherein a pattern is drawn with a temperature responsive high polymer on the target surface of a capillary plate, permeability control by means of temperature can be carried out in a position selective manner. That is to say, at a temperature higher than the transition point the surface becomes hydrophobic and, thus, becomes impermeable. At a temperature lower than the transition point the surface becomes hydrophilic and, thus, becomes permeable. In summary, in the case wherein water is used as the solvent, the Laplace pressure is controllable, which makes it possible to operate the microreactor as a microreactor having a switching function.

In order to fabricate a microreactor as described above, first, a bromo group is introduced onto the surface of a capillary plate (using isopropylamide or the like) and this capillary plate is immersed in a mixture of methanol and DMF (in a ratio of 1:1) that contains 1% to 5% of N,N,N',N'',N''-pentamethyldiethylenetriamine and 0.1% to 5% of copper bromide (I) (hereinafter referred to as solvent 1).

Next, the above-described embodiment of the present invention is set so that a solution that is gained by diluting 0.1% to 5% of N-isopropylacrylamide with the above-described solution 1 (hereinafter referred to as reagent 1) is supplied to the first conduit 11, and the opening 11a of the first conduit 11 is located in close proximity to the target point on the surface of the capillary plate. The reagent 1 is dispensed through the opening 11a of the first conduit 11 at a rate of 1 μL to 100 μL per minute, and the solvent 1 and the reagent 1 are suctioned up through the opening 12a of the second conduit 12 at a rate of 1 μL to 500 μL per minute and, thus, the target point and vicinity are chemically modified. The capillary plate and the first and second conduits 11 and 12 can be moved relative to each other in the x and y directions by driving the stage 4 so that a pattern can be drawn in a specified region. This is implemented in a nitrogen atmosphere.

As a result, a temperature responsive high polymer can be introduced only onto the target surface of a capillary plate.

Figure 2:
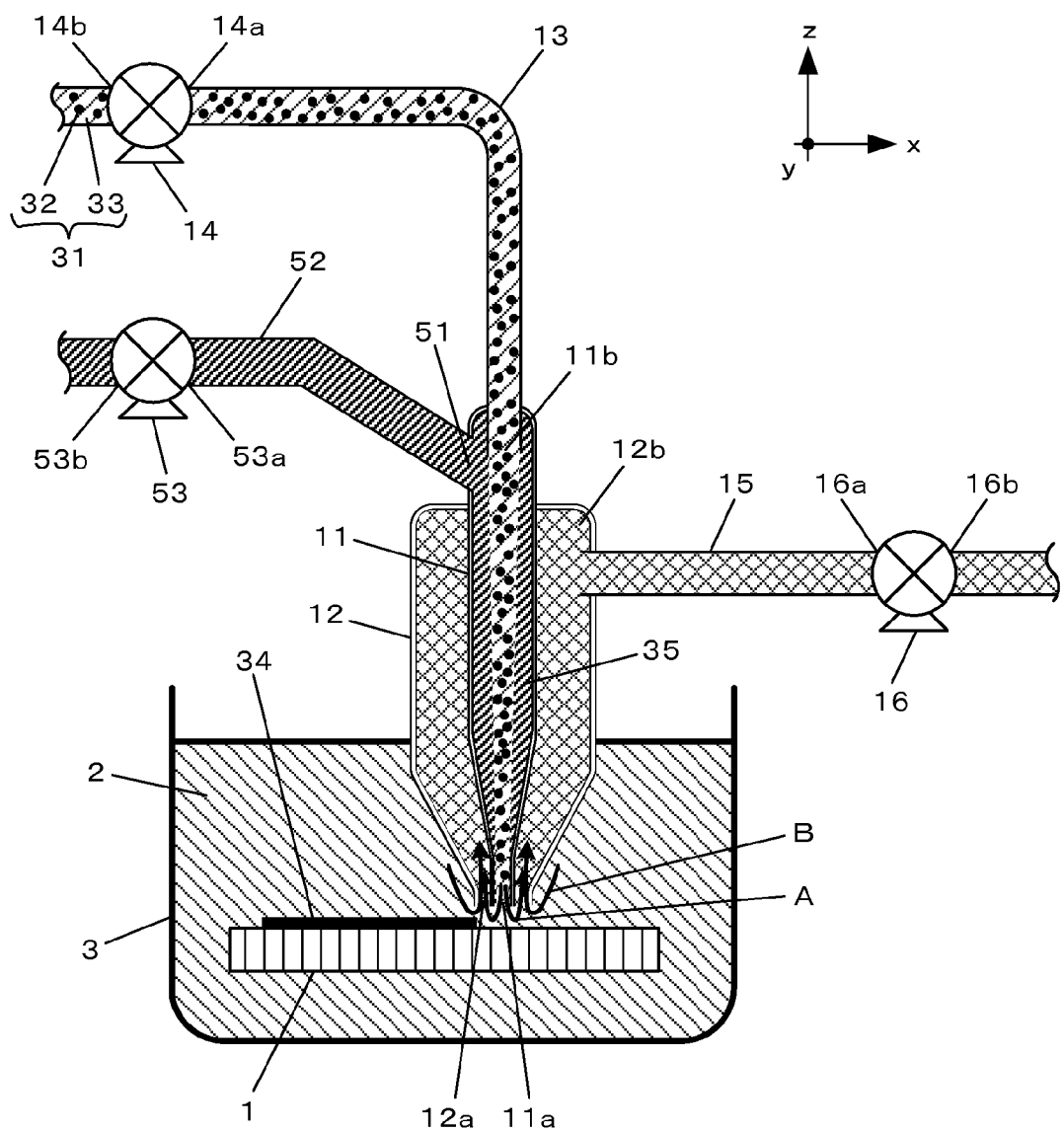
FIG. 2 is a schematic diagram showing the structure of the main portion of another embodiment of the present invention.

Next, another embodiment of the present invention is described. FIG. 2 is a schematic diagram showing the main portion of the structure and the same symbols are attached to the same members as in FIG. 1 and the descriptions thereof are omitted.

The embodiment in FIG. 2 is characterized in that an opening for sheath formation 51 is provided in proximity to the upper end of the first conduit 11 and an end of a conduit for supplying a sheath liquid 52 is connected to the opening for sheath formation 51. The other end of the conduit for supplying a sheath liquid 52 communicates with the opening for dispensing 53a of the pump for supplying a sheath liquid 53, and the opening for suction 53b of the pump for supplying a sheath liquid 53 communicates with a sheath liquid tank for storing a sheath liquid 35 (not shown). When the pump for supplying a sheath liquid 53 is driven, the sheath liquid 35 flows into the first conduit 11 so as to form a sheath flow made up of a patterning solution 31 and a sheath liquid 35 and, thus, the flow of the patterning solution 31 is converged to the center of the first conduit 11. Accordingly, the patterning solution 31 that has flown out through the opening 11a at the lower end of the first conduit 11 forms a stream narrower than the diameter of the opening 11a. The pump for discharge 16 is driven so as to suction up and discharge the sheath liquid 35 and the solvent 33, into which the liquid phase medium 2 has been mixed, as well as a portion of the solute 32 through the opening 12a of the second conduit 12.

This structure utilizing a sheath flow makes it possible to further miniaturize the patterning as compared to the above example. In particular, even when there is a restriction on the diameter of the opening 11a of the first conduit 11 due to manufacturing technology or ease of maintenance, it is possible to draw lines that are narrower than the diameter of the opening 11a.

Though glass pipes and resin pipes are used for the first conduit 11, the second conduit 12, the conduit for supplying a sheath liquid 52 and the like in the above-described embodiments for illustrative purposes, the present invention is not limited to these cases and, in addition to the usage of pipes of these materials, pipes may be formed of a structure made of Si in accordance with MEMS technology having a structure equivalent to the above-described pipes and, in such cases, further miniaturization of the patterning may be possible.

Though the above-described embodiments provide examples wherein the solid phase surface is patterned while the stage on which the solid phase surface is mounted is being moved, the present invention can, of course, adopt a structure having a mechanism wherein the solid phase surface is fixed and the first and second conduits are moved.

INDUSTRIAL APPLICABILITY

According to the present invention, target molecules can be formed in any pattern in any location on a glass material or on a silicon substrate, for example, and, thus, the present invention can be effectively applied to an apparatus that carries out fine pattern surface chemical treatment on a solid phase surface using a solution, such as fabrication of various types of fine sensors or sensor arrays, or patterning of molecules having a thionyl group on a metal film, or patterning of other molecules in specific portions on top of the patterned molecules having a thionyl group.

EXPLANATION OF SYMBOLS

1 solid phase
2 liquid phase (or gas phase)
3 container
4 stage
11 first conduit
12 second conduit
13 pipe
14 pump for injection
15 pipe
16 pump for discharge
21 moving mechanism
22 control unit
23 setting unit
24 memory unit
31 patterning solution
32 solute
33 solvent
34 patterning region
35 sheath liquid
51 opening for sheath formation
52 conduit for supplying sheath liquid
53 pump for supplying sheath liquid

The invention claimed is:

1. A surface chemical treatment apparatus for drawing a predetermined pattern by carrying out a chemical treatment in the predetermined pattern through drawing on a solid phase surface placed in a liquid phase medium, comprising:
    a container including the liquid phase medium, the solid phase surface being provided within the liquid phase medium;
    a first conduit having an opening at one end and communicating at the other end with a liquid supply section for supplying a patterning solution that draws the predetermined pattern on the solid phase surface by reacting with the solid phase surface for the chemical treatment on the surface;
    a conduit for supplying a sheath liquid through which the sheath liquid is supplied into said first conduit so that a sheath flow can be created within the first conduit so as to converge the patterning solution to a center of the first conduit; and
    a second conduit having at one end an opening that surrounds the opening of said first conduit and communicating with a liquid suction section at the other end; wherein
    a moving mechanism for moving the container so that the solid phase surface is moved relative to the openings of the first and second conduits while the solid phase surface is immersed within the liquid phase medium,
    a chemically treated region of the predetermined pattern is created by moving the openings of the first and second conduits relative to the solid phase surface while allowing said patterning solution to be supplied into said first conduit from said liquid supply section, and at the same time, allowing said sheath liquid to be supplied into said first conduit from said conduit for supplying the sheath liquid so that said patterning solution is converged to the center of the first conduit, and the patterning solution is then dispensed through the opening of the first conduit, and while driving the liquid suction section so that the patterning solution dispensed through the opening of the first conduit is suctioned up together with the liquid phase medium through the opening of the second conduit.

2. The surface chemical treatment apparatus according to claim 1, wherein said moving mechanism is a mechanism for moving the openings and the solid phase surface in a three-dimensional manner relative to each other, and the openings and the solid phase surface move relative to each other according to a route that has been set in advance by a setting unit.

3. The surface chemical treatment apparatus according to claim 1, wherein said first and second conduits, or said first and second conduits together with the conduit for supplying sheath liquid, are made of a structure formed of silicon.

4. The surface chemical treatment apparatus according to claim 1, wherein the moving mechanism is provided outside of the container and under the solid phase surface.

5. A surface chemical treatment apparatus, comprising:
a container that contains a liquid phase medium in which a solid phase surface on which a patterning process is to be carried out is immersed;
a stage on which said container is placed;
a moving mechanism for moving said stage;
a dual conduit made up of a first conduit having a first opening at the bottom end and a second conduit which is arranged so as to surround said first conduit and which has a second opening that surrounds said first opening;
a pipe which communicates with the upper end of said first conduit and through which a patterning solution is supplied via a pump for injection;
a conduit for supplying a sheath liquid which is connected to an opening for sheath formation provided in proximity to the upper end of said first conduit and through which the sheath liquid is supplied via a pump for supplying the sheath liquid; and
a pipe that communicates with the upper end of said second conduit and is connected to a pump for discharge that suctions a liquid, wherein
said first opening and said second opening are arranged so as to face the solid phase surface within said liquid phase medium, and
a pattern is drawn on the solid phase surface through a chemical treatment by moving said stage while allowing the patterning solution to be dispensed through the first opening, and at the same time, allowing the patterning solution to be suctioned up together with the liquid phase medium through the second opening.

6. The surface chemical treatment apparatus according to claim 5, wherein the moving mechanism is provided outside of the container and under the solid phase surface.

7. The surface chemical treatment apparatus according to claim 5, wherein said moving mechanism is a mechanism for moving the openings and the solid phase surface in a three-dimensional manner relative to each other, and the openings and the solid phase surface move relative to each other according to a route that has been set in advance by a setting unit.

8. The surface chemical treatment apparatus according to claim 5, wherein said first and second conduits, or said first and second conduits together with the conduit for supplying sheath liquid, are made of a structure formed of silicon.

* * * * *